July 8, 1969 J. M. WARD ET AL 3,454,453
SODIUM CARBONATE TREATMENT OF HIGH SILICA FIBER PRODUCTS
Filed March 17, 1966
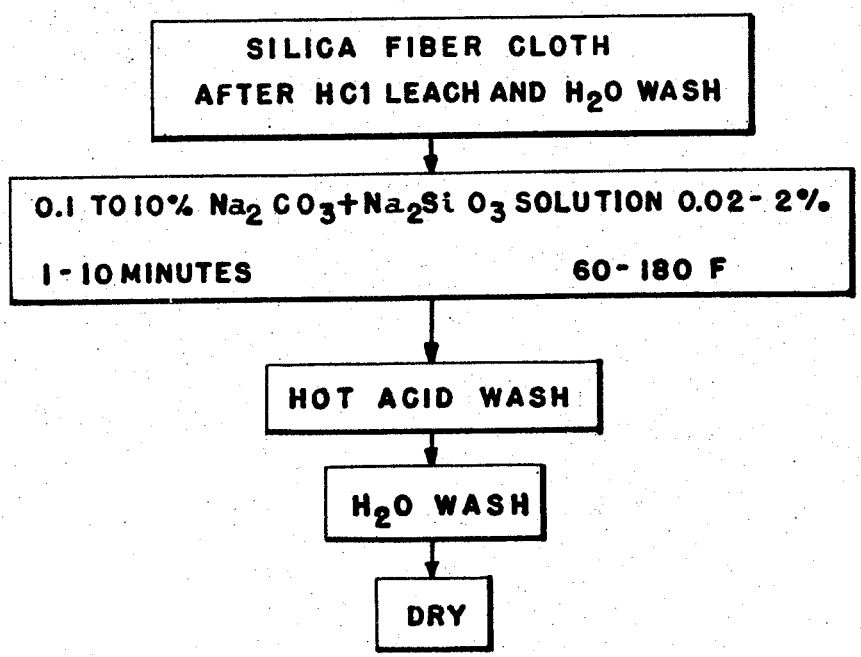
INVENTORS
JOHN M. WARD
BY GEORGE L. SQUIRE
Cushman, Darby & Cushman
ATTORNEYS

United States Patent Office 3,454,453
Patented July 8, 1969

3,454,453
SODIUM CARBONATE TREATMENT OF HIGH SILICA FIBER PRODUCTS
John M. Ward and George L. Squire, Wilmington, Del., assignors to Haveg Industries, Inc., Wilmington, Del., a corporation of Delaware
Filed Mar. 17, 1966, Ser. No. 535,176
Int. Cl. C03c 25/00
U.S. Cl. 161—7                                                   10 Claims

ABSTRACT OF THE DISCLOSURE

A product formed by the process of treating acid leached glass fibers with an aqueous mixture of an alkali metal carbonate and an alkali metal silicate which improves the strength, softness and wettability of said fibers with plastic materials.

---

The present invention relates to the preparation of high silica fibers and fabrics.

It has been proposed in the past to acid extract glass fibers and fabrics to prepare high silica fibers and fabrics, e.g. as shown in Moore Patent 2,995,803 and Anderson Patent 3,125,476. Such products have a sodium carbonate soluble silica of at least 90%, most preferably 92–95%, although acid extraction can be continued until the sodium carbonate soluble silica is as much as 99% or more. The total silica also is at least 90% and generally approximates the sodium carbonate soluble silica. The acid used for extraction is preferably hydrochloric acid although other acids can be used as nitric acid, sulfuric acid, hydrobromic acid, trichloroacetic acid, acetic acid and the like. The glass fibers which are treated are preferably in the form of cloth but can be in the form of rovings, cordage and yarn.

Following the acid etching or leaching the thus produced silica fibers are washed with water to remove the salts, e.g. chlorides, present as a result of the conversion of the leachable oxides.

Such procedures, however, have not produced products having the maximum tensile strength. Also the products are much harsher than desired and show lack of uniformity in wettability of the material.

It is an object of the present invention to prepare high silica fibers and fabrics of improved softness.

Another object is to prepare high silica fibers and fabrics of increased tensile strength.

An additional object is to improve the uniformity in wettability of high silica fibers and fabrics with resin systems.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by treating high silica fibers and cloth subsequent to the acid leach and water washing with an aqueous mixture of sodium carbonate ($Na_2CO_3$) and sodium silicate ($Na_2SiO_3$).

It is critical to use a mixture of sodium carbonate and sodium silicate since the overall improvement in tensile strength, softness and wettability with resin systems is not observed if either the sodium carbonate or sodium silicate is employed alone.

Any of the high silica fibers and fabrics previously set forth, i.e. those having a sodium carbonate silica content of at least 90% can be used. In the specific examples there was employed silica cloth prepared by hydrochloric acid extraction of glass cloth to a silica content of 92–93% followed by a water wash.

Unless otherwise indicated, all parts and percentages are by weight.

The single figure of the drawings is a block diagram of the process employed in the invention.

The aqueous solution preferably should contain 0.1 to 10% sodium carbonate and 0.002 to 2% sodium silicate. In place of sodium silicate there can be used potassium silicate and in place of sodium carbonate there can be used potassium carbonate. The time of aqueous sodium carbonate-sodium silicate threatment is generally 1 to 10 minutes but can be longer or shorter than this. The temperature of treatment is usually 60 to 180° F. but can be varied. Room temperature is conveniently employed.

The liquid to cloth weight ratio can be widely varied, e.g. from 1:1 to 10:1 and is preferably 5:1. In general, the longer the time of treatment up to 10 minutes the greater the degree of softness imparted to the silica fibers.

After the silica fibers, e.g. silica cloth has been thus treated it is washed with acid to retard any degradation of the silica fibers by the sodium carbonate-sodium silicate solution. There can be employed any conventional strong acids such as hydrochloric acid, sulfuric acid, nitric acid, trichloroacetic acid, hydrobromic acid or the like. This acid treatment can be at a temperature from room temperature to the boiling point of water and can be for a period of minutes, e.g. 5 minutes, to an hour or longer. Preferably hydrochloric acid is used. The hydrochloric acid can be from 0.24% to 30% but usually is 3 to 24%.

Following the acid treatment the silica fibers, e.g. as silica cloth, are thoroughly washed with water to remove all residual acids and salts possible. Then the washed cloth is moved to the wash and dry line and then to the shrinker line where it is converted into the finished high silica fiber cloth.

The product has been found to have uniformity in wettability with resin systems such as conventional binding resins, e.g. phenolic resins including phenolformaldehyde, cresol-formaldehyde and phenol-furfural; melamine-aldehyde resins, e.g. melamine-formaldehyde; epoxy resins, e.g. bisphenol A-epichlorhydrin resin; polyester resins, e.g. styrene modified ethylene glycol-propylene glycol-maleate.

EXAMPLE 1

Silica fiber cloth having a sodium carbonate soluble silica content of about 92.5% which had been prepared by hydrochloric acid leaching of No. 1584 glass cloth followed by water washing to remove the chlorides was immersed in an aqueous mixture of 5% sodium carbonate and 1% sodium silicate ($Na_2O.3.25SiO_2$) solution containing 37.8% sodium silicate 70° F. for 10 minutes. The liquid to cloth ratio was 5 to 1.

After the cloth was thus treated it was given a wash in 12% hydrochloric acid at 120° F. for 30 minutes to retard any degradation of the silica fiber cloth by the sodium carbonate-sodium silicate solution. The cloth was then thoroughly washed with water to remove all residual acids and salts. It then was moved in conventional fashion to the wash and dry line and to the shrinker line.

EXAMPLE 2

There was employed Sil-Temp silica fiber cloth having a sodium carbonate soluble silica content of between 92 and 93% which had been prepared by hydrochloric acid leaching of glass cloth followed by water washing. The washed cloth was immersed in the indicated aqueous mixture of sodium carbonate and sodium silicate at room temperature for 10 minutes using a solution to cloth ratio of 10:1. The sodium silicate solution employed was the same as in Example 1. After the cloth was treated with the sodium carbonate-sodium silicate it was washed with the indicated hydrochloric acid at 120° F. for 30 minutes and then thoroughly washed with water. The conditions of treatment are set forth in Table 1 and the properties of the treated cloth are set forth in Table 2. The resin pick up was measured for SC–1008 phenolic resin (a phenol-formaldehyde resin).

TABLE 1

| Run | Percent Na₂CO₃ | Percent sodium silicate solution | HCl concentration (percent) |
|---|---|---|---|
| 1 | 0 | 0.02 | 0.24 |
| 2 | 0.5 | 0.1 | 1.2 |
| 3 | 1.0 | 0.2 | 2.4 |
| 4 | 2.5 | 0.5 | 6.0 |
| 5 | 5.0 | 1.0 | 12.0 |

TABLE 2

| Run | Cloth tensile (p.s.i.) | Flexural rigidity, mg. cm. × 100 | Resin pickup, g./100 g. cloth |
|---|---|---|---|
| 1 | 107 | 177 | 54.6 |
| 2 | 76 | 91 | 65.3 |
| 3 | 78 | 57 | 65.5 |
| 4 | 85 | 7.7 | 68.4 |
| 5 | 109 | 4.3 | 69.8 |

A sharp drop in tensile strength of the cloth was observed in the region between 0 and 0.5% sodium carbonate in the aqueous mixture. Then there was a gradual build up in tensile strength which was at an accelerated rate above 3% sodium carbonate and 0.6% sodium silicate solution in the aqueous mixture. The stiffness dropped off very sharply to 0.5% sodium carbonate. The drop off was less sharp to about 2.0% sodium carbonate and was quite gradual thereafter. The resin pickup increased sharply to 0.5% sodium carbonate and gradually thereafter.

The silica fiber treatment of the present invention is also useful in improving wettability of high silica fibers for rubbers such as natural rubber and synthetic rubbers, e.g. butadiene-styrene copolymer, butyl rubber, etc.

We claim:
1. A process comprising treating acid leached glass fibers having a sodium carbonate soluble silica content of at least 90% with an aqueous mixture of an alkali metal carbonate and an alkali metal silicate.
2. A product prepared by the process of claim 1.
3. A process according to claim 1 wherein the alkali metal carbonate is sodium carbonate and the alkali metal silicate is sodium silicate.
4. A process according to claim 3 including the additional step of acid washing the treated fibers.
5. A process according to claim 4 wherein the acid is hydrochloric acid.
6. A process according to claim 3 wherein the aqueous treating solution contains 0.1 to 10% sodium carbonate and 0.02 to 2% sodium silicate.
7. A process according to claim 6 wherein the treatment is for 1 to 10 minutes.
8. A process according to claim 6 including the additional step of washing the treated fibers with hydrochloric acid of 0.24 to 30% concentration.
9. A process according to claim 8 wherein there is used an aqueous mixture of 0.5 to 5% sodium carbonate and 0.1 to 1% of sodium silicate.
10. A process according to claim 9 wherein there is used at least 2.5% sodium carbonate and at least 0.5% sodium silicate solution in the aqueous mixture.

References Cited
UNITED STATES PATENTS

| 2,315,259 | 3/1943 | Hyde | 117—126 |
| 2,710,266 | 6/1955 | Hochberg | 117—126 XR |
| 3,002,857 | 10/1961 | Stalego | 117—126 |
| 3,232,788 | 1/1966 | Marzocchi et al. | 117—126 |
| 3,326,715 | 6/1967 | Twells | 117—124 |

ROBERT F. BURNETT, *Primary Examiner.*

W. A. POWELL, *Assistant Examiner.*

U.S. Cl. X.R.

65—31; 117—54, 126; 156—24; 161—172